United States Patent
Vidyadhara et al.

(10) Patent No.: US 10,303,487 B2
(45) Date of Patent: May 28, 2019

(54) SYSTEM AND METHOD FOR BOOTING AN INFORMATION HANDLING SYSTEM

(71) Applicant: DELL PRODUCTS, L.P., Round Rock, TX (US)

(72) Inventors: Sumanth Vidyadhara, Bangalore (IN); Parmeshwr Prasad, Bangalore (IN); Vijay Bharat Nijhawan, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 213 days.

(21) Appl. No.: 15/157,707

(22) Filed: May 18, 2016

(65) Prior Publication Data

US 2017/0337064 A1    Nov. 23, 2017

(51) Int. Cl.
    G06F 9/4401    (2018.01)

(52) U.S. Cl.
    CPC ............ G06F 9/441 (2013.01); G06F 9/4401 (2013.01)

(58) Field of Classification Search
    None
    See application file for complete search history.

(56) References Cited

U.S. PATENT DOCUMENTS

| | | | |
|---|---|---|---|
| 2006/0149913 A1* | 7/2006 | Rothman | G06F 12/023 713/2 |
| 2014/0297999 A1 | 10/2014 | Kim et al. | |
| 2013/0290778 A1 | 7/2015 | Soderlund et al. | |
| 2015/0235030 A1 | 8/2015 | Chaiken et al. | |
| 2016/0019106 A1 | 1/2016 | Ali et al. | |
| 2016/0054926 A1 | 2/2016 | Gillespie et al. | |
| 2016/0188345 A1* | 6/2016 | Chen | G06F 9/4403 713/2 |

OTHER PUBLICATIONS

Murphy, Finnbarr. (Aug. 18, 2012). UEFI Memory V E820 Memory Musings. [online] Blog.fpmurphy.com. Available at: https://blog.fpmurphy.com/2012/08/uefi-memory-v-e820-memory.html [Accessed Jan. 22, 2018; Archived on Jul. 20, 2015 at archive.net].*

* cited by examiner

*Primary Examiner* — Kim Huynh
*Assistant Examiner* — Joshua Neveln
(74) *Attorney, Agent, or Firm* — Isidore PLLC (57) ABSTRACT

A method, information handling system (IHS) and subsystem for enabling booting of the IHS using different operating system configurations. The method includes retrieving, via a processor, a unified extensible firmware interface (UEFI) image from a storage device and initializing at least one UEFI runtime service. The processor determines if a memory map corresponding to the UEFI runtime service defines multiple memory descriptors. In response to determining that the memory map defines multiple memory descriptors, a common memory descriptor is identified. The UEFI runtime service and the corresponding memory map are aligned to the common memory descriptor. The aligned UEFI runtime service and the corresponding memory map are copied to a system memory of the IHS. The operating system is booted, wherein the aligned UEFI runtime service and the corresponding memory map are compatible with operating systems that support single runtime memory descriptors.

20 Claims, 7 Drawing Sheets

SYSTEM AND METHOD FOR BOOTING AN INFORMATION HANDLING SYSTEM

BACKGROUND

1. Technical Field

The present disclosure generally relates to information handling systems and in particular to a system and method for booting an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Unified extensible firmware interface (UEFI) is a specification that defines a software interface between an operating system and platform firmware. UEFI replaces the basic input/output system (BIOS) found on older information handling systems. UEFI provides a standard architecture and data structure to manage initialization and configuration of devices, booting of platform resources, and passing of control to the operating system. The UEFI specification allows for the extension of platform firmware by loading UEFI driver and application images.

BRIEF SUMMARY

Disclosed are a method, an information handling system (IHS), and a sub-system for enabling the IHS to be booted using different operating system configurations.

According to one embodiment, the computer-implemented method includes retrieving, via a processor, a unified extensible firmware interface (UEFI) image from a storage device and initializing at least one UEFI runtime service. The processor determines if a memory map corresponding to the UEFI runtime service defines multiple memory descriptors. In response to determining that the memory map defines multiple memory descriptors, a common memory descriptor is identified. The UEFI runtime service and the corresponding memory map are aligned to the common memory descriptor. The aligned UEFI runtime service and the corresponding memory map are copied to a system memory of the IHS. The operating system is booted. The aligned UEFI runtime service and the corresponding memory map are compatible with operating systems that support single runtime memory descriptors.

According to another embodiment, the IHS includes a storage device storing at least one unified extensible firmware interface (UEFI) image and a processor communicatively coupled to the storage device. The processor has firmware executing thereon to enable the IHS to be booted using different operating system versions. The firmware configures the processor to retrieve the UEFI image from the storage device and initialize at least one UEFI runtime service. The firmware further configures the processor to determine if a memory map corresponding to the UEFI runtime service defines multiple memory descriptors. In response to determining that the memory map defines multiple memory descriptors, a common memory descriptor is identified. The UEFI runtime service and the corresponding memory map are aligned to the common memory descriptor. The aligned UEFI runtime service and the corresponding memory map are copied to a system memory of the IHS. The operating system is booted. The aligned UEFI runtime service and the corresponding memory map are compatible with operating systems that support single runtime memory descriptors.

In an additional embodiment, the sub-system includes a storage device storing at least one unified extensible firmware interface (UEFI) image and a processor communicatively coupled to the storage device. The processor has firmware executing thereon to enable the IHS to be booted using different operating system versions. The firmware configures the processor to retrieve the UEFI image from the storage device and initialize at least one UEFI runtime service. The firmware further configures the processor to determine if a memory map corresponding to the UEFI runtime service defines multiple memory descriptors. In response to determining that the memory map defines multiple memory descriptors, a common memory descriptor is identified. The UEFI runtime service and the corresponding memory map are aligned to the common memory descriptor. The aligned UEFI runtime service and the corresponding memory map are copied to a system memory of the IHS. The operating system is booted. The aligned UEFI runtime service and the corresponding memory map are compatible with operating systems that support single runtime memory descriptors.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS) and a sub-system for enabling the IHS to be booted using different operating system configurations.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
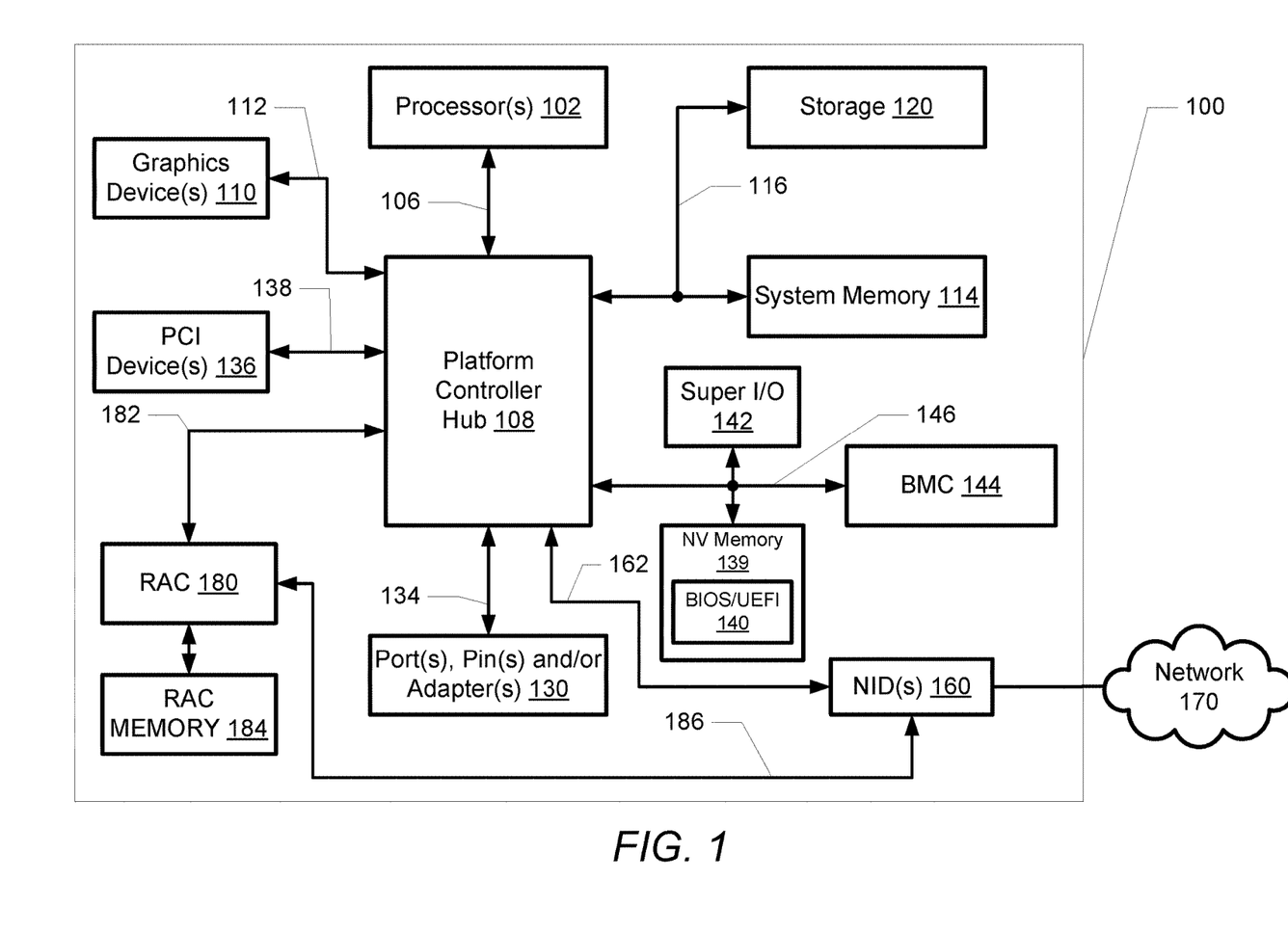
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via memory bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

Also coupled to memory bus 116 is storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile storage or memory device 139 that stores a basic input output system/unified extensible firmware interface (BIOS/UEFI) 140 via Low Pin Count (LPC) bus 146. PCH 108 is also coupled to super I/O Controller 142 and baseboard management controller (BMC) 144 via LPC bus 146.

BIOS/UEFI 140 is stored on non-volatile memory 139 and includes program instructions stored thereon. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 may include non-volatile memory 139 having program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the BIOS' firmware interface to initialize and test components of IHS 100. Super I/O Controller 142 combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108.

IHS 100 further comprises one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. RAC 180 provides management functions that allow an administrator to deploy, monitor, manage, configure, update, troubleshoot and remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

Figure 2A:
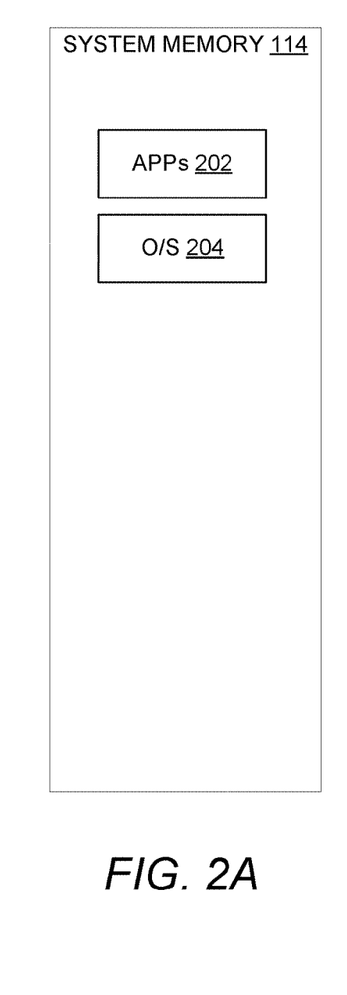
FIG. 2A illustrates example contents of a system memory in an IHS, in accordance with one embodiment.

With reference now to FIG. 2A, one embodiment of example contents of system memory 114 of IHS 100 is shown. System memory 114 includes data, software, and/or firmware modules, including application(s) 202, and operating system (O/S) 204. System memory 114 can also include other data, software, and/or firmware modules.

Figure 2B:
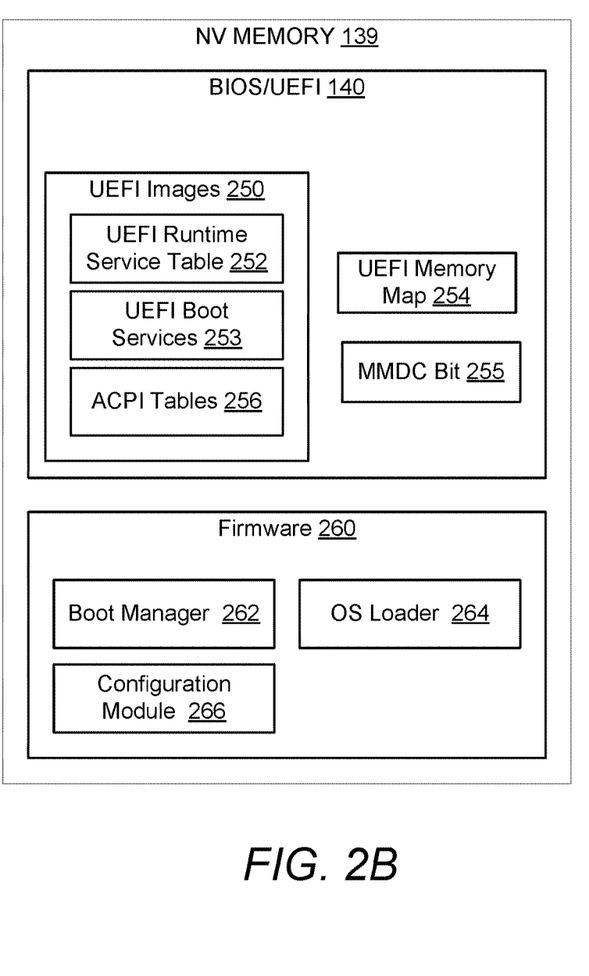
FIG. 2B illustrates example contents of a non-volatile memory that includes firmware for booting the IHS, in accordance with one embodiment.

Turning to FIG. 2B, one embodiment of example contents of NV memory 139 of IHS 100 is shown. NV memory 139 includes BIOS/UEFI 140 and separate firmware 260 that enables booting of IHS 100 when BIOS/UEFI 140 contains multiple memory descriptors. BIOS/UEFI 140 stores UEFI images 250 that can be loaded during system start-up by IHS 100. UEFI images 250 include UEFI runtime services table (UEFI runtime services) 252, UEFI boot services 253 and Advanced Configuration and Power Interface (ACPI) table 256. BIOS/UEFI 140 further includes UEFI memory map 254 and a multiple memory descriptor capable (MMDC) bit 255.

ACPI is an industry specification that provides an open standard that operating systems can use for computer hardware discovery, configuration, power management, and monitoring. ACPI exports the available functionalities by providing certain instruction lists or tables as part of the system firmware. ACPI tables 256 are loaded into system memory 114 during system startup and executed during the OS boot-up stage. ACPI tables 256 define the interface between an ACPI-compliant operating system, and system firmware. Most of the firmware ACPI functionality is provided in ACPI Machine Language (AML) byte-code stored in the ACPI tables 256. When MMDC bit 255 is set, the operating system supports multiple runtime memory descriptors. UEFI runtime services from UEFI runtime services table 252 are services that are available during system booting after a device execution phase has started until OS 204 is running. UEFI boot services 253 are services that are available only while the firmware owns the platform (i.e., before the ExitBootServices call), and they include text and graphical consoles on various devices, and bus, block and file services Firmware 260 contains a boot manager or UEFI loader 262, an OS loader module 264, and configuration module 266. Firmware 260 is a software and/or firmware module that executes on processor 102 of IHS 100 (i.e., when booting). Boot manager 262 operates during the device execution phase (DXE) of booting and facilitates the loading of UEFI images 250. OS loader 264 operates during the transient system load phase of booting and facilitates the loading of OS 204. Configuration module 266 operates during the transient system load phase (TSL) phase and enables the IHS to do small/specific task. The configuration module 266 performs the steps 516 to 522 presented in the flowchart in FIG. 5A.

Figure 3:
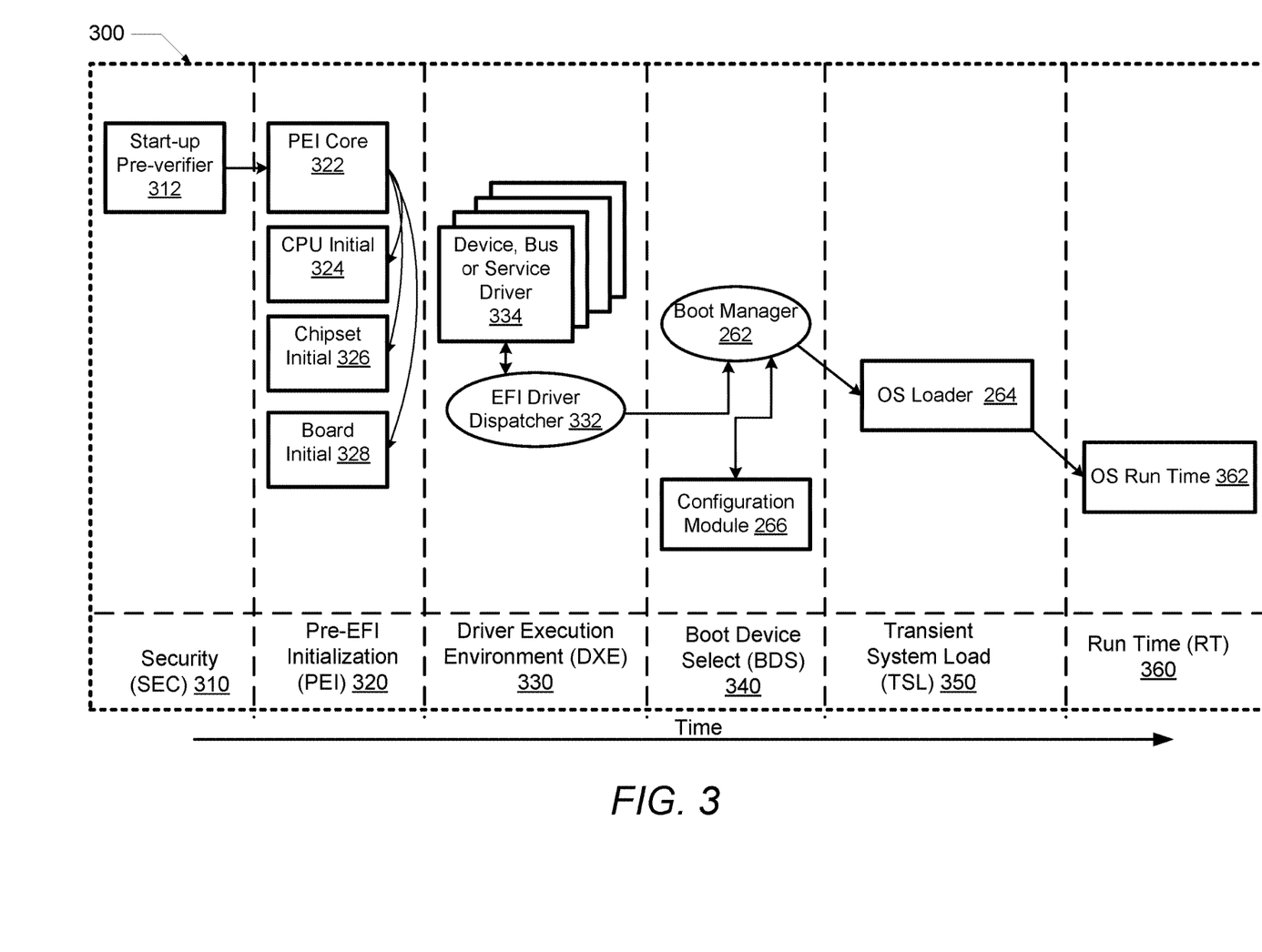
FIG. 3 is a timing or phase diagram for a UEFI boot of an IHS.

FIG. 3 illustrates a timing or phase diagram 300 of a boot operation for IHS 100. As shown, the boot operation includes security phase (SEC) 310, pre-EFI initialization phase (PEI) 320, driver execution environment phase (DXE) 330, boot device selection phase (BDS) 340, transient system load phase (TSL) 350, and run time phase (RT) 360. SEC 310 is the first phase of a UEFI boot process on the IHS that operates to set up a pre-verifier 312. Pre-verifier 312 handles all restart events on the IHS, and temporarily allocates a portion of memory for use during the other boot phases. SEC 310 is executed out of the firmware resident on the IHS and serves as a root of trust for the system.

SEC 310 passes execution to PEI 320 which initializes the system memory for the IHS. PEI 320 sets up PEI core 322 that includes CPU initialization 324, chipset initialization 326, and board resource initialization 328. PEI 320 passes execution to DXE 330 which performs device specific initializations for the IHS. In particular, DXE 330 executes an EFI driver dispatcher 332 that operates to load device, bus, and service drivers 334. DXE 330 passes execution to BDS 340, which executes boot manager 262 and configuration module 266. In a particular embodiment, configuration module 266 operates in DXE 330 and TSL 350. Boot manager 262 also identifies a boot target, and passes execution to TSL 350. TSL 350 launches an OS loader 264. The OS loader 264 loads the operating system and passes execution to the operating system at OS runtime 362.

Figure 4A:
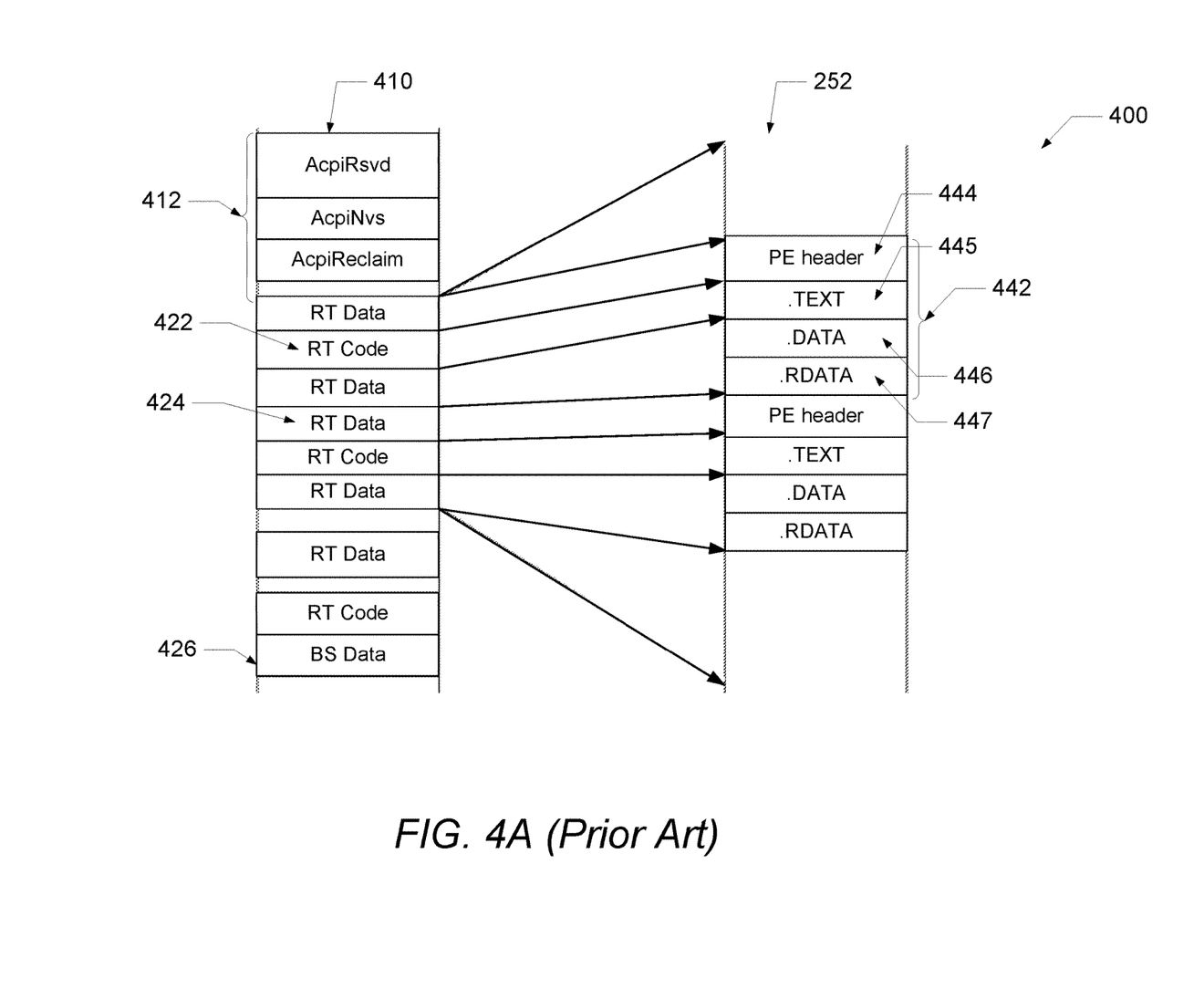
FIG. 4A illustrates a conventional UEFI memory map with multiple memory descriptors.

FIG. 4A illustrates a conventional UEFI memory map 400 with multiple memory descriptors. The operating system (OS) can load a kernel, driver or application in the right system memory location only if the OS knows how the memory is formatted or allocated. The UEFI 2.5 specification includes data execution protection (DEP). DEP is intended to prevent an application or service from executing code from a non-executable memory region. This helps prevent certain exploits that store code via a buffer overflow. DEP marks areas of memory region with one of several memory descriptors. Examples of memory descriptors include executable or non-executable regions of memory. A memory region that is marked as being non-executable will experience a fault if an attempt to execute machine code in these regions occurs during the boot process.

Memory map 400 is a structure of data that indicates how the memory is laid out. Memory map 400 includes memory descriptors 410 that are mapped to or correspond to sections of a UEFI runtime service 252. UEFI runtime services 252 are stored in a portable executable common object file format (PE/COFF) image 442 that can be formatted to include a PE header 444 and section data including, .text 445, .data 446 and .rdata 447.

Memory descriptors 410 include ACPI memory descriptors 412, runtime code 422 that is executable, runtime data 424 that is non-executable and boot stack (BS) data 426. ACPI memory descriptors 412 include ACPI reserved, ACPI non-volatile storage and APCI reclaim. As shown in FIG. 4A, PE/COFF image 442 is mapped to multiple memory descriptors. PE header 444 is mapped as runtime data which is non-executable, .text 445 is mapped as runtime code which is executable, .data 446 is mapped as runtime data which is non-executable, and rdata 447 is mapped as runtime data which is non-executable. If the PE/COFF image 442 with multiple memory descriptors 410, stored in system memory 114, is accessed at runtime by an older version of OS 204 that does not support multiple memory descriptors (for example, Windows 8 or earlier) IHS 100 will experience a failure condition. In other words, older versions of OS 204 may not support multiple memory descriptors, which can cause OS crashes at runtime.

Figure 4B:
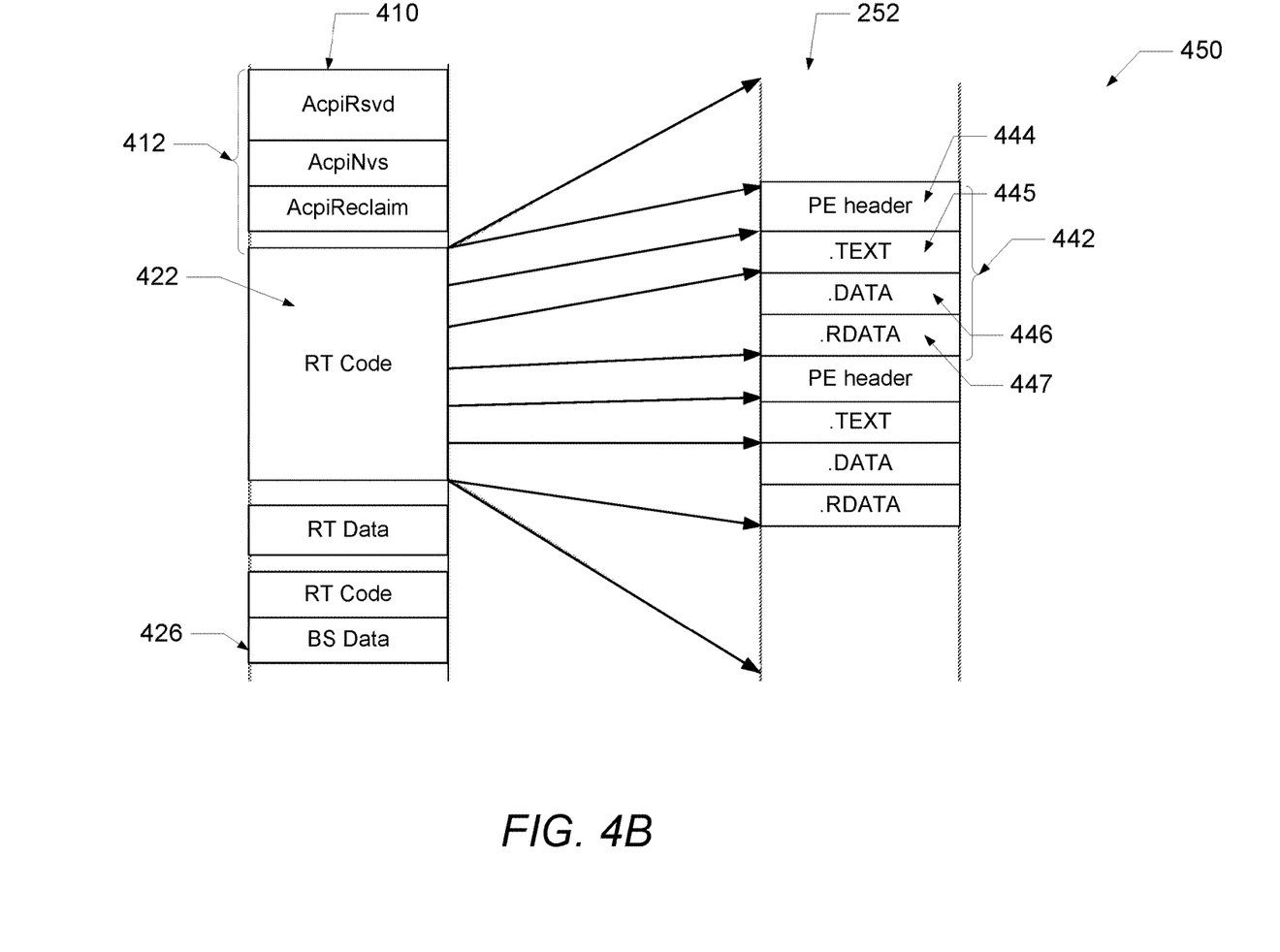
FIG. 4B illustrates a UEFI memory map with a single memory descriptor, in accordance with one embodiment.

Referring to FIG. 4B, a UEFI memory map 450 with a single or common memory descriptor is shown. UEFI memory map 450 is different than the conventional UEFI memory map 400 of FIG. 4A. The PE/COFF image 442 is mapped to a single common memory descriptor. PE header 444, .text 445, .data 446 and .rdata 447 are mapped as runtime code 422 which is executable. An older version of OS 204 that accesses PE/COFF image 442 with a single memory descriptor stored in system memory 114, will not experience a failure condition.

Figure 5A:
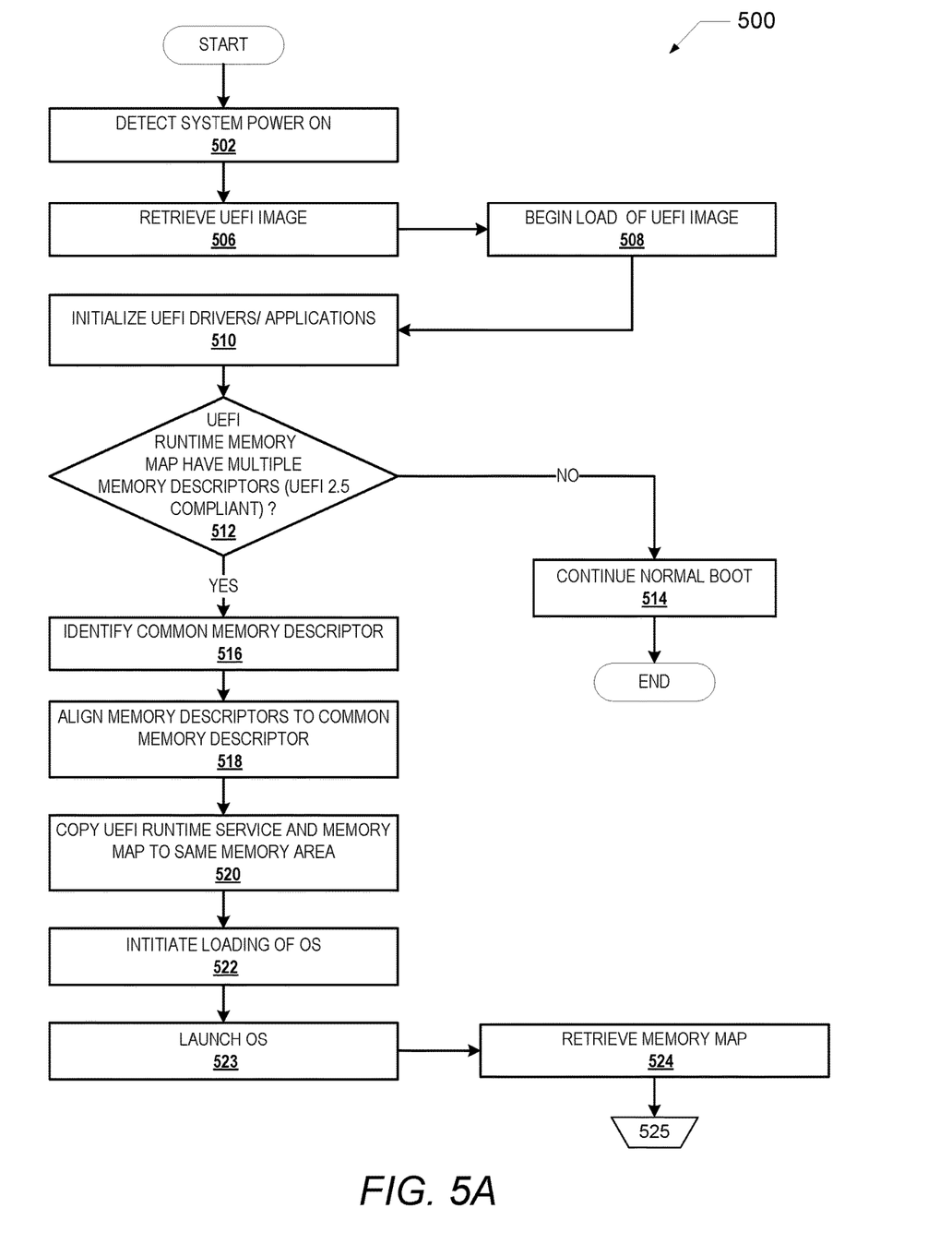
FIGS. 5A-B are a flow chart illustrating one example of a method of enabling booting an IHS from operating systems that support multiple runtime memory descriptors and operating systems that support single runtime memory descriptors, in accordance with one embodiment.
Figure 5B:
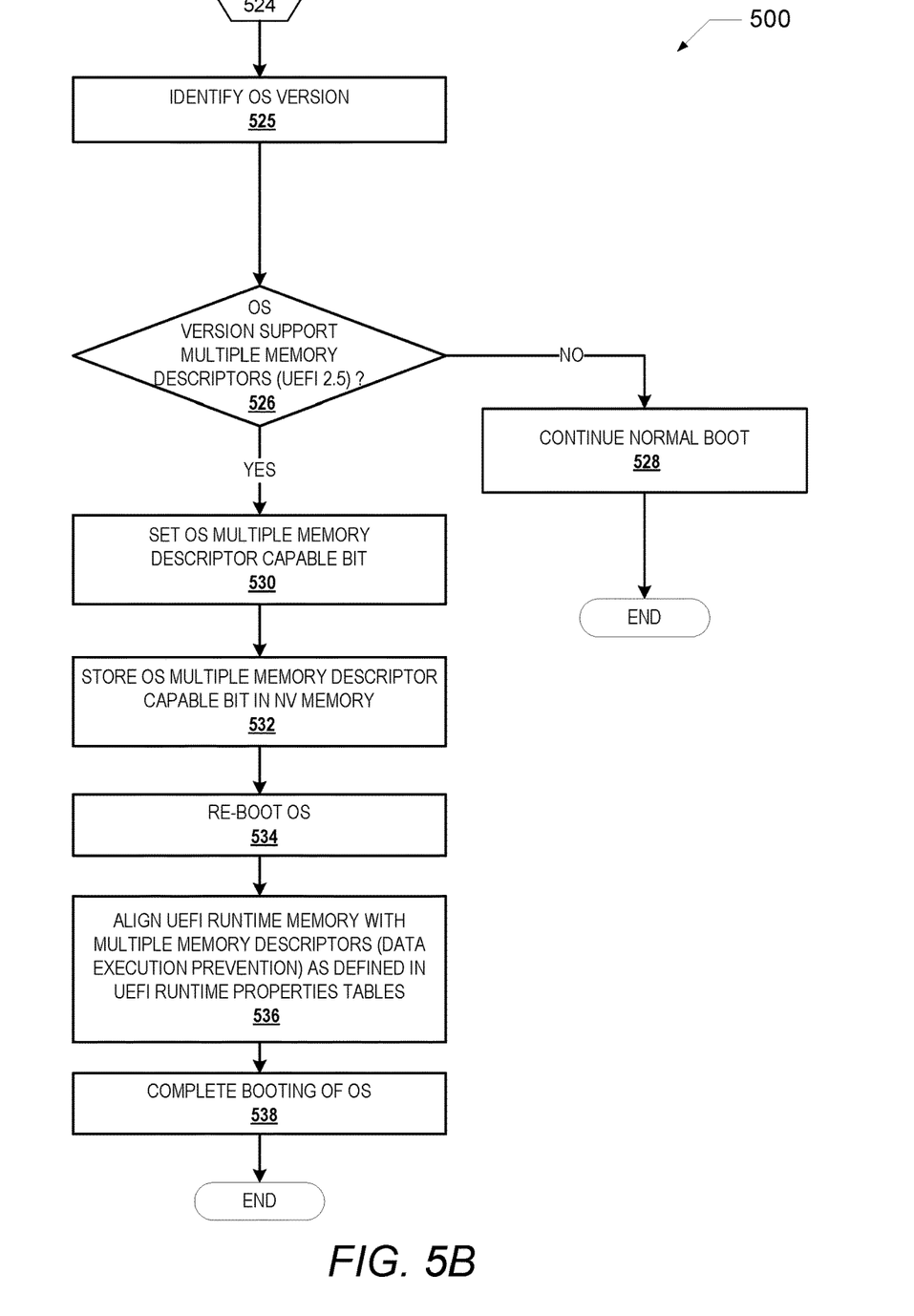

FIGS. 5A and 5B illustrate a flowchart of an exemplary method 500 by which processor 102 within the preceding figures performs different aspects of the processes that enable the one or more embodiments of the disclosure. Generally, method 500 represents a computer-implemented method for enabling an IHS to be booted using different operating system configurations. The description of method 500 is provided with general reference to the specific components illustrated within the preceding FIGS. 1-4. Generally, method 500 is described as being implemented via processor 102 and particularly the execution of code provided by firmware 260 and specifically by the firmware of boot manager 262, OS loader 264, and configuration module 266 acting within processor 102. In one embodiment, method 500 can be described as being implemented via processor 102 and particularly the execution of code provided by UEFI boot services 262 acting within processor 102. It is however appreciated that certain aspects of the described methods may be implemented via other processing devices and/or execution of other code.

Referring to the flow chart of FIG. 5A, method 500 begins at the start block and proceeds to block 502 where processor 102 detects that IHS 100 has been started or powered on. In response to IHS 100 being started or powered on, processor 102 retrieves UEFI image 250 from NV memory 139 (block 506).

Processor 102 begins to load the UEFI image 139 (block 508) and initializes at least one UEFI runtime service 252 including UEFI drivers and applications (block 510). Processor 102 determines if memory map 400 corresponding to UEFI runtime service 252 defines multiple memory descriptors 422, 424 (decision block 512). In other words, processor 102 determines if memory map 400 is compliant to the UEFI 2.5 specification that supports multiple memory descriptors. In response to determining that the memory map does not define multiple memory descriptors (i.e., the memory map only has a single memory descriptor), processor 102 continues normal booting of IHS 100 using a normal boot process (block 514). Method 500 then ends.

In response to determining that the memory map defines multiple memory descriptors, processor 102 identifies a single common memory descriptor 422 (block 516). Processor 102 aligns the UEFI runtime service 252 and the corresponding memory map 450 to have a single common memory descriptor 422 (block 518). Processor 102 copies the aligned UEFI runtime service and the corresponding memory map 450 to the same area of system memory 114 (block 520). Blocks 508 through 520 occur during the DXE phase 330 of boot timeline 300. Processor 102 initiates loading of OS 204 (block 522), launches the OS (block 523) and retrieves the memory map 450 (block 524).

Turning now to FIG. 5B, after block 524, processor 102 identifies a configuration or version of OS 204 (block 525). Processor 102 determines if the version of OS 204 supports multiple memory descriptors (decision block 526). In other words, processor 102 determines if OS 204 is compliant to the UEFI 2.5 specification. In response to determining that OS 204 does not support multiple memory descriptors, processor 102 continues normal booting of IHS 100 using a normal boot process (block 528). Method 500 then terminates.

In response to determining that OS 204 does support multiple memory descriptors, processor 102 sets MMDC bit 255 (block 530) and stores the MMDC bit 255 to NV memory 139 (block 532). Processor 102 re-boots OS 204 (block 534) such that upon re-booting, the MMDC bit enables the OS to support multiple runtime memory descriptors. Processor 102 aligns the UEFI runtime service 252 and the corresponding memory map 400 to include multiple memory descriptors (block 536) and completes loading of OS 204 (block 538). The aligned UEFI runtime service and corresponding memory map are compatible with OSs that support multiple runtime memory descriptors. Method 500 then ends.

Method 500 allows for IHS 100 to be booted using both OSs that support single runtime memory descriptors and OSs that support multiple runtime memory descriptors. Processor 102 executes configuration module 266 during the time that UEFI boot services are running and configures the memory descriptors, as described in method 500. After the ExitBootService is called, the UEFI boot service is no longer in memory, and only the UEFI RuntimeService is available.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for enabling an information handling system (IHS) to be booted using different operating system configurations, the method comprising:
    retrieving, via a processor, a unified extensible firmware interface (UEFI) image from a storage device;
    initializing at least one UEFI runtime service, the UEFI runtime service stored in a portable executable common object file format (PE/COFF) image with multiple components;
    determining if a memory map corresponding to the UEFI runtime service defines multiple memory descriptors, the memory map being a structure of data that indicates how memory is laid out and include memory descriptors that are mapped to sections of the at least one UEFI runtime service;
    in response to determining that the memory map defines multiple memory descriptors, identifying a common memory descriptor;
    aligning the UEFI runtime service and the corresponding memory map to the common memory descriptor, wherein each of the multiple components within the PE/COFF image of the UEFI runtime service are mapped as runtime code that is executable, and the common memory descriptor enables an operating system that does not support multiple memory descriptors in a PE/COFF image to access the PE/COFF image of the UEFI runtime service without experiencing a failure condition;
    copying the aligned UEFI runtime service and the corresponding memory map to a system memory of the IHS; and
    booting the operating system, wherein the aligned UEFI runtime service and the corresponding memory map are compatible with operating systems that support a single runtime memory descriptor and operating systems that support multiple memory descriptors.

2. The method of claim 1, further comprising:
    initiating loading of the operating system;
    identifying a version of the operating system;
    retrieving the memory map;
    determining if the version of the operating system supports multiple memory descriptors;
    in response to determining that the version of the operating system supports multiple memory descriptors, aligning the UEFI runtime service and the corresponding memory map to multiple memory descriptors; and
    completing loading of the operating system, wherein the aligned UEFI runtime service and the corresponding memory map are compatible with operating systems that support multiple runtime memory descriptors.

3. The method of claim 1, further comprising:
    initiating loading of the operating system;
    identifying a version of the operating system;
    determining if the version of the operating system supports multiple memory descriptors;
    in response to determining that the version of the operating system supports multiple memory descriptors, setting a multiple memory descriptor capable (MMDC) bit indicating that the operating system supports multiple runtime memory descriptors;

storing the MMDC bit to the storage device; and re-booting the operating system, wherein in response to the MMDC bit being set, the UEFI runtime service and the corresponding memory map are aligned to support multiple runtime memory descriptors.

4. The method of claim 1, wherein the multiple memory descriptors include executable and non-executable memory descriptors and the memory map contains regions of memory that are labeled as being either executable or non-executable regions of memory.

5. The method of claim 1, further comprising:

in response to determining that the version of the operating system does not support multiple memory descriptors, booting the IHS utilizing a normal boot process.

6. The method of claim 1, further comprising:

in response to determining that the memory map does not define multiple memory descriptors, booting the IHS, utilizing a normal boot process.

7. The method of claim 1, wherein the UEFI image comprises at least one advanced configuration and power interface (ACPI) table and a UEFI runtime service table.

8. An information handling system (IHS) comprising:

a storage device storing at least one unified extensible firmware interface (UEFI) image;

a processor communicatively coupled to the storage device, the processor having firmware executing thereon to enable the IHS to be booted using different operating system versions, wherein the firmware configures the processor to:

retrieve the UEFI image from the storage device;

initialize at least one UEFI runtime service, the UEFI runtime service stored in a portable executable common object file format (PE/COFF) image with multiple components;

determine if a memory map corresponding to the UEFI runtime service defines multiple memory descriptors, the memory map being a structure of data that indicates how memory is laid out and include memory descriptors that are mapped to sections of the at least one UEFI runtime service;

in response to determining that the memory map defines multiple memory descriptors, identify a common memory descriptor;

align the UEFI runtime service and the corresponding memory map to the common memory descriptor, wherein each of the multiple components within the PE/COFF image of the UEFI runtime service are mapped as runtime code that is executable, and the common memory descriptor enables an operating system that does not support multiple memory descriptors in a PE/COFF image to access the PE/COFF image of the UEFI runtime service without experiencing a failure condition;

copy the aligned UEFI runtime service and the corresponding memory map to a system memory of the IHS; and boot the operating system, wherein the aligned UEFI runtime service and the corresponding memory map are compatible with operating systems that support a single runtime memory descriptor and operating systems that support multiple memory descriptors.

9. The information handling system of claim 8, wherein the firmware further configures the processor to:

initiate loading of the operating system;

identify a version of the operating system;

retrieve the memory map;

determine if the version of the operating system supports multiple memory descriptors;

in response to determining that the version of the operating system supports multiple memory descriptors, align the UEFI runtime service and the corresponding memory map to multiple memory descriptors; and complete loading of the operating system, wherein the aligned UEFI runtime service and the corresponding memory map are compatible with operating systems that support multiple runtime memory descriptors.

10. The information handling system of claim 8, wherein the firmware further configures the processor to:

initiate loading of the operating system;

identify a version of the operating system;

determine if the version of the operating system supports multiple memory descriptors;

in response to determining that the version of the operating system supports multiple memory descriptors, set a multiple memory descriptor capable (MMDC) bit indicating that the operating system supports multiple runtime memory descriptors;

store the MMDC bit to the storage device; and re-boot the operating system, wherein if the MMDC bit is set, the UEFI runtime service and the corresponding memory map are aligned to support multiple runtime memory descriptors.

11. The information handling system of claim 8, wherein the multiple memory descriptors include executable and non-executable memory descriptors and the memory map contains regions of memory that are labeled as being either executable or non-executable regions of memory.

12. The information handling system of claim 8, wherein the firmware further configures the processor to:

in response to determining that the version of the operating system does not support multiple memory descriptors, boot the IHS utilizing a normal boot process.

13. The information handling system of claim 8, wherein the firmware further configures the processor to:

in response to determining that the memory map does not define multiple memory descriptors, boot the IHS, utilizing a normal boot process.

14. The information handling system of claim 8, wherein the UEFI image comprises at least one advanced configuration and power interface (ACPI) table and a UEFI runtime services table.

15. A sub-system for managing booting of an information handling system (IHS), the sub-system comprising:

a storage device storing at least one unified extensible firmware interface (UEFI) image;

a processor communicatively coupled to the storage device, the processor having firmware executing thereon to enable the IHS to be booted using different operating system versions, wherein the firmware configures the processor to:

retrieve the UEFI image from the storage device;

initialize at least one UEFI runtime service, the UEFI runtime service stored in a portable executable common object file format (PE/COFF) image with multiple components;

determine if a memory map corresponding to the UEFI runtime service defines multiple memory descriptors, the memory map being a structure of data that indicates how memory is laid out and include memory descriptors that are mapped to sections of the at least one UEFI runtime service;

in response to determining that the memory map defines multiple memory descriptors, identify a common memory descriptor;

align the UEFI runtime service and the corresponding memory map to the common memory descriptor, wherein each of the multiple components within the PE/COFF image of the UEFI runtime service are mapped as runtime code that is executable, and the common memory descriptor enables an operating system that does not support multiple memory descriptors in a PE/COFF image to access the PE/COFF image of the UEFI runtime service without experiencing a failure condition;

copy the aligned UEFI runtime service and the corresponding memory map to a system memory of the IHS; and boot the operating system, wherein the aligned UEFI runtime service and the corresponding memory map are compatible with operating systems that support a single runtime memory descriptor and operating systems that support multiple memory descriptors.

16. The sub-system of claim 15, wherein the firmware further configures the processor to:
   initiate loading of the operating system;
   identify a version of the operating system;
   retrieve the memory map;
   determine if the version of the operating system supports multiple memory descriptors;
   in response to determining that the version of the operating system supports multiple memory descriptors, align the UEFI runtime service and the corresponding memory map to multiple memory descriptors; and
   complete loading of the operating system, wherein the aligned UEFI runtime service and the corresponding memory map are compatible with operating systems that support multiple runtime memory descriptors.

17. The sub-system of claim 15, wherein the firmware further configures the processor to:
   initiate loading of the operating system;
   identify a version of the operating system;
   determine if the version of the operating system supports multiple memory descriptors;
   in response to determining that the version of the operating system supports multiple memory descriptors, set a multiple memory descriptor capable (MMDC) bit indicating that the operating system supports multiple runtime memory descriptors;
   store the MMDC bit to the storage device; and
   re-boot the operating system, wherein if the MMDC bit is set, the UEFI runtime service and the corresponding memory map are aligned to support multiple runtime memory descriptors.

18. The sub-system of claim 15, wherein the multiple memory descriptors include executable and non-executable memory descriptors and the memory map contains regions of memory that are labeled as being either executable or non-executable regions of memory.

19. The sub-system of claim 15, wherein the firmware further configures the processor to:
   in response to determining that the version of the operating system does not support multiple memory descriptors, boot the IHS utilizing a normal boot process.

20. The sub-system of claim 15, wherein the firmware further configures the processor to:
   in response to determining that the memory map does not define multiple memory descriptors, boot the IHS, utilizing a normal boot process.

* * * * *